United States Patent
Keshavan

(10) Patent No.: US 10,186,286 B2
(45) Date of Patent: Jan. 22, 2019

(54) TECHNIQUES FOR REDUCING DYNAMIC COUPLING OF SYSTEM MODES IN A DUAL ACTUATOR HARD DISK DRIVE

(71) Applicant: Western Digital Technologies, Inc., San Jose, CA (US)

(72) Inventor: Manoj Keshavan, San Jose, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 15/616,804

(22) Filed: Jun. 7, 2017

(65) Prior Publication Data

US 2018/0358038 A1   Dec. 13, 2018

(51) Int. Cl.
*G11B 5/48* (2006.01)
*G11B 5/55* (2006.01)

(52) U.S. Cl.
CPC .......... *G11B 5/4813* (2013.01); *G11B 5/5521* (2013.01); *G11B 5/5578* (2013.01)

(58) Field of Classification Search
None
See application file for complete search history.

(56) References Cited

U.S. PATENT DOCUMENTS

| | | | |
|---|---|---|---|
| 4,984,115 A * | 1/1991 | Takahashi et al. | G11B 25/043 360/265.2 |
| 5,666,242 A | 9/1997 | Edwards et al. | |
| 5,761,007 A | 6/1998 | Price et al. | |
| 5,920,441 A | 7/1999 | Cunningham et al. | |
| 5,930,071 A | 7/1999 | Back | |
| 6,005,743 A | 12/1999 | Price et al. | |
| 6,449,130 B1 * | 9/2002 | Koyama | G11B 5/4813 360/264.4 |
| 6,480,363 B1 | 11/2002 | Prater | |
| 6,490,138 B1 | 12/2002 | Prater | |
| 6,560,075 B2 | 5/2003 | Price et al. | |
| 6,603,640 B1 | 8/2003 | Prater et al. | |
| 6,687,092 B2 | 2/2004 | Kan et al. | |
| 6,747,836 B2 | 6/2004 | Stevens et al. | |
| 6,847,504 B1 | 1/2005 | Bennett et al. | |

(Continued)

OTHER PUBLICATIONS

Dual Actuator tuned mass damper pivot bearing, IP.com database, original publication date: Feb. 1, 2000, included in prior art database: Jun. 18, 2003, 2 pages, IP.com disclosure No. IPCOM000013589D, IP.com I, LLC.

*Primary Examiner* — Craig A. Renner
(74) *Attorney, Agent, or Firm* — John D. Henkhaus

(57) ABSTRACT

An actuator pivot assembly for a multi-actuator shared shaft data storage device may include a shared pivot shaft around which a first rotary actuator assembly is coupled, with a first bearing assembly interposed therebetween with a first bearing preload, and around which a second rotary actuator assembly is coupled, with a second bearing assembly interposed therebetween with a second different bearing preload. Furthermore, the first bearing assembly may have a first bearing span and the second bearing assembly may have a second bearing span that is different from the first bearing span. Each of the foregoing bearing features may thereby assist with spacing apart the structural resonance frequencies of the actuator assemblies to inhibit transmission of vibration between the actuators during operation.

20 Claims, 4 Drawing Sheets

(56) References Cited

U.S. PATENT DOCUMENTS

| | | |
|---|---|---|
| 6,961,212 B1 | 11/2005 | Gustafson et al. |
| 7,469,463 B2 | 12/2008 | Prater et al. |
| 7,513,030 B2 | 4/2009 | Aoyagi et al. |
| 7,649,288 B1 * | 1/2010 | Brown .................. H02K 33/02 310/75 D |
| 2002/0149884 A1 | 10/2002 | Price et al. |
| 2003/0156358 A1 | 8/2003 | Jeong |
| 2004/0095672 A1 | 5/2004 | Price |
| 2005/0248877 A1 | 11/2005 | Kim |

* cited by examiner

TECHNIQUES FOR REDUCING DYNAMIC COUPLING OF SYSTEM MODES IN A DUAL ACTUATOR HARD DISK DRIVE

FIELD OF EMBODIMENTS

Embodiments of the invention may relate generally to data storage devices such as hard disk drives, and particularly to managing transmission of vibration in a dual-actuator hard disk drive utilizing a single shared shaft.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

Increasing areal density (a measure of the quantity of information bits that can be stored on a given area of disk surface) is one of the ongoing goals of hard disk drive technology evolution. In one form, this goal manifests in the type of high-capacity HDDs that are especially attractive in the context of enterprise, cloud computing/storage, and data center environments. However, the performance of high-capacity HDDs has not necessarily scaled up commensurately with the increases in capacity. This has led to the necessary development and implementation of various means for increasing HDD performance.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Generally, approaches to managing vibration transmission associated with a dual-actuator shared shaft actuator system are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of an Illustrative Operating Context

Embodiments may be used in the context of a digital data storage device (DSD), such as a hard disk drive (HDD). Thus, in accordance with an embodiment, a plan view illustrating an HDD 100 is shown in FIG. 1 to illustrate an exemplary operating context.

Figure 1:
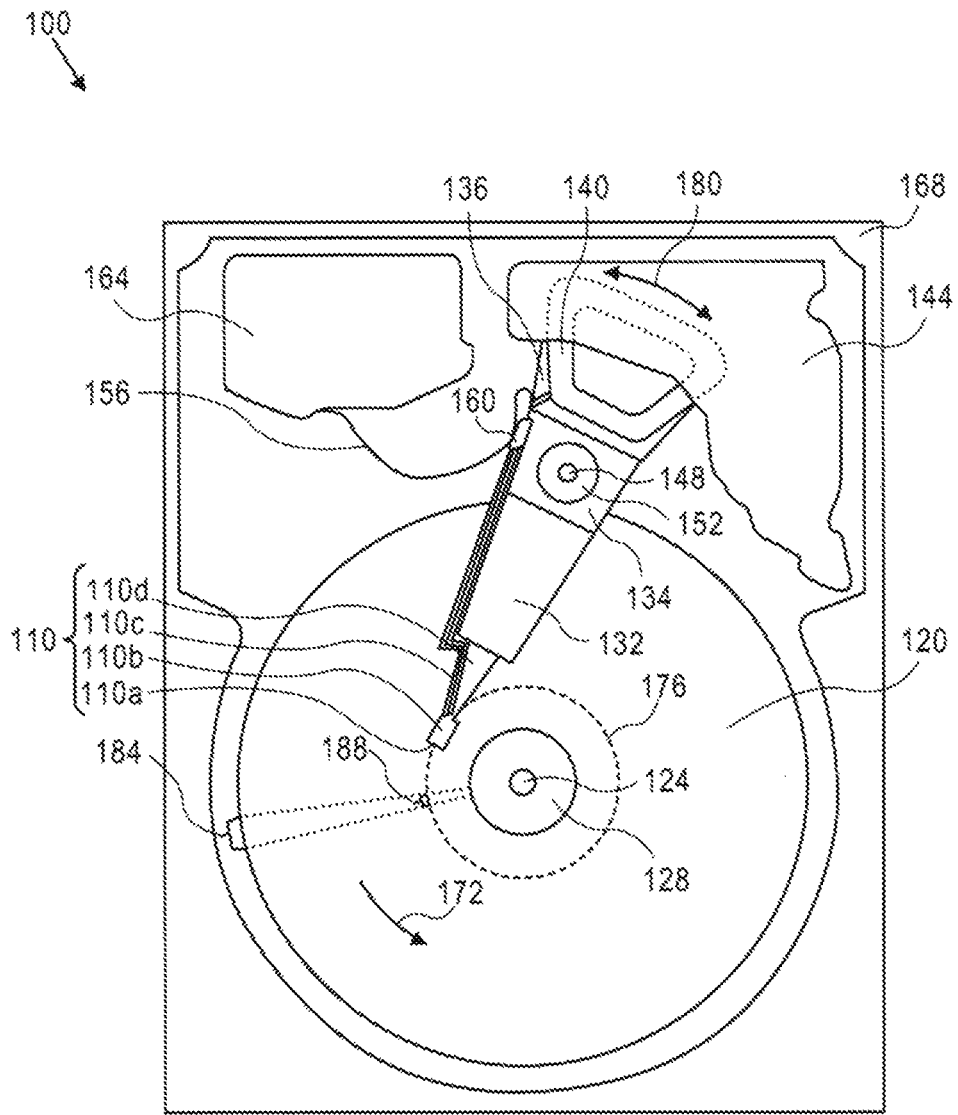
FIG. 1 is a plan view illustrating a hard disk drive (HDD), according to an embodiment.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

Recall the observation that the performance of high-capacity HDDs has not scaled up commensurately with increases in storage capacity. This IOPs/TB (referred to as "IOPs density") deficit stands in the way of widespread adoption of such HDDs. In other words, the high latencies of large capacity HDDs in a clustered environment, such as in data centers with multiple clustered nodes, limits their appeal due to slower access to stored data. The pressure to increase the performance (e.g., IOPs/TB) by reducing the latencies for data operations of high-capacity HDDs has become even stronger in view of the market penetration that solid-state storage continues to achieve.

One possible approach to increasing HDD performance is the implementation of multi-actuator systems, in which multiple independently operating actuators with respective bearings are assembled onto a single pivot shaft in order to independently and concurrently read to and/or write from multiple recording disks of a disk stack. However, the operation of multiple actuators on a shared pivot shaft can structurally couple the vibration modes of the two individual actuators, leading to transfer of vibrational energy between actuators by way of the shared shaft. That is, operation (i.e., rotary movement) of one actuator generates forces that transfer via the shared shaft to the other actuator(s). This vibration transferred to the other actuator(s) affects the ability of the corresponding read-write transducer (or "head") to efficiently arrive at, and to stay on-track, resulting in excessive track mis-registration ("TMR"). TMR limits the performance of HDDs in that an inordinate amount of time is expended trying to position and maintain the head well-centered over a data track (e.g., via servoing). The corresponding read or write operations are effectively delayed as a result, thus reducing overall I/O performance.

The number of actuators that may be assembled onto a single shared pivot shaft may vary from implementation to implementation; however, an exemplary but non-limiting dual-actuator arrangement is described throughout herein.

Dual-Actuator Shared Shaft Dynamic Coupling Control

One challenge with vibration transmission alluded to above pertains to the coupling of actuator system modes, e.g., when primary butterfly modes of the individual actuators overlap, or are in close proximity to one another. Typically, a butterfly mode involves significant deformation of the arms of the E-block, coil and pivot bearing assembly, with all the arms moving in phase with one another. In scenarios where respective butterfly mode resonant frequencies of each actuator system (considered separately) are clustered together, the modes couple and assume a global or extended form. Vibrational energy is then efficiently transmitted from one actuator to the other at these "combined system" resonant frequencies. This scenario would play out in cases in which one actuator is seeking, while the other actuator is transferring data from/to disk. The actuator that is seeking would excite the combined system modes and increase the vibration level in the actuator transferring data, leading to a detrimental effect on system performance. Further, in those scenarios where the butterfly mode resonant frequencies of the individual actuator systems (considered separately) are close, a "beating" phenomenon could also occur between the now global (extended) modes of the combined system of actuators. The resulting motion can expose the actuator transferring data to/from disk to sudden excursions leading to off-track writes (poor data integrity) or degraded read performance.

According to an embodiment, one approach to managing or controlling the dynamic coupling of primary system modes between actuator systems in a dual-actuator shared shaft system is to separate, or increase the separation between, the dominant system modes. This has the effect of reducing the gains in the coupling transfer function. This may be achieved by utilizing different pivot bearing preloads on each of the bearing systems, thereby manifesting as a different stiffness for each of the pivot bearing systems.

Figure 2:
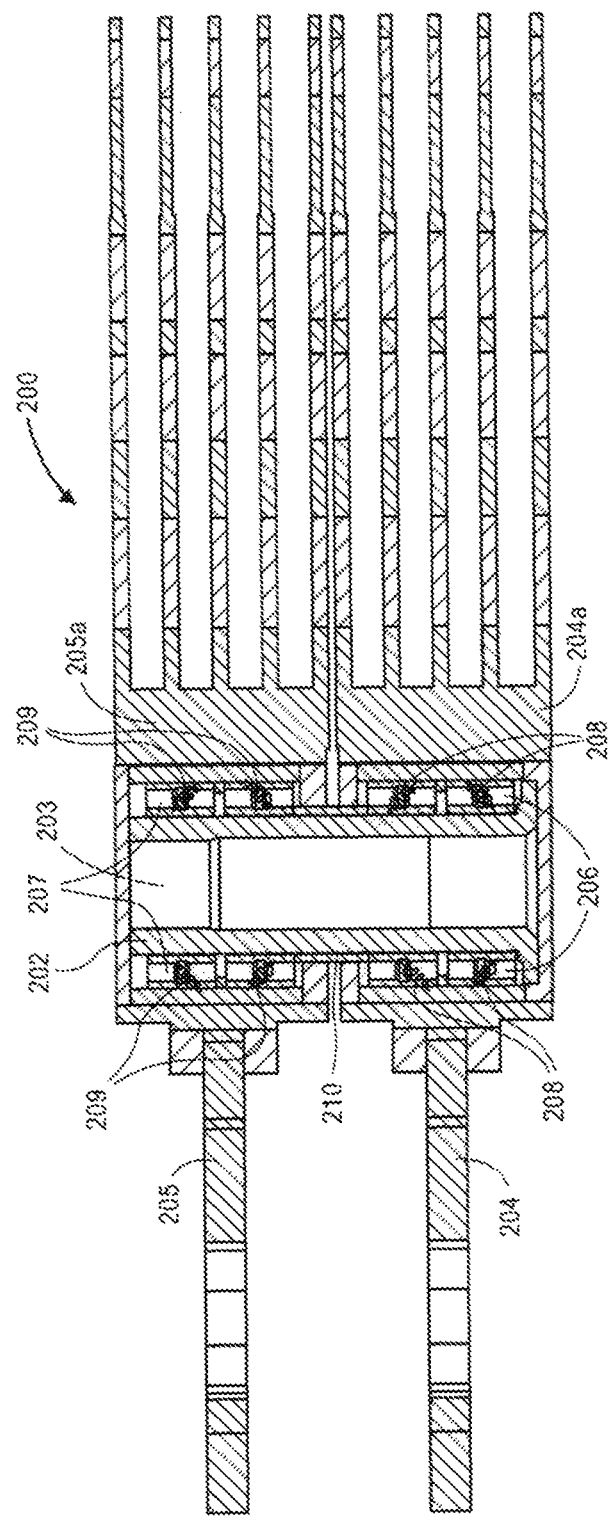
FIG. 2 is a cross-sectional side view illustrating a dual-actuator shared shaft actuator system, according to an embodiment.

FIG. 2 is a cross-sectional side view illustrating a dual-actuator shared shaft actuator system, according to an embodiment. Actuator system 200 comprises a shaft 202 having a bore 203 at least partially therethrough. According to an embodiment, the shaft 202 is utilized as a pivot shaft, or part of an actuator pivot assembly or shared shaft assembly, for multiple actuators constituent to a multi-actuator shared shaft data storage device such as a hard disk drive (HDD). As such, actuator system 200 comprises the shaft 202, around which a first or lower rotary actuator assembly 204 (e.g., a voice coil actuator, and including a carriage 204a, such as carriage 134 of FIG. 1) is rotatably coupled at a first location of shaft 202, with a lower bearing assembly 206 interposed therebetween, and around which a second upper rotary actuator assembly 205 (e.g., a voice coil actuator, and including a carriage 205a, such as carriage 134 of FIG. 1) is rotatably coupled at a second location of shaft 202, with an upper bearing assembly 207 interposed therebetween. Note that each of the lower bearing assembly 206 and the upper bearing assembly 207, and like bearings referenced herein, may be configured as bearing assemblies comprising multiple bearings (for a non-limiting example, each bearing assembly may comprise two ball bearings, as depicted).

According to an embodiment, the first or lower bearing assembly 206 is coupled with the shaft 202 with a particular preload 208 (depicted as springs in FIG. 2), and the second or upper bearing assembly 207 is coupled with the shaft 202 with a particular preload 209 (also depicted as springs in FIG. 2), where the preload 208 is different from the preload 209. The manner in which preload 208 and preload 209 are applied may vary from implementation to implementation, with some non-limiting procedures known in the art. For example, in the case where the preload 209 of the upper bearing assembly 207 is the same as preload 208 of the lower bearing assembly 206, an axial load may be applied to one of the inner or outer race of a bearing (e.g., the uppermost bearing) of the bearing assembly (e.g., bearing assembly 207) while the other corresponding race is held fixed (e.g., to an outer bearing sleeve), whereby the applied load is transmitted through that bearing to the other bearing (e.g., the lower bearing) of the bearing assembly through the bearing spacer 210. However, when preload 208 of the lower bearing assembly 206 is different from preload 209 of the upper bearing assembly 207, the assembly and preloading are done in stages, wherein a first axial load is applied to the lower bearing assembly 206, followed by an adhesive curing process to lock in the resulting preload 208. This is followed by the installation of the bearing spacer 210 and the upper bearing assembly 207, following which a second different axial load is applied to the upper bearing assembly 207 obtain the preload 209.

Regardless of the preloading procedure used, preloading a bearing assembly affects the contact angle(s) corresponding to the balls and races of a given bearing, which in turn affects the relative stiffness of the bearing (e.g., radial and axial stiffness). The stiffness of each bearing assembly 206, 207 is a characteristic of, or affects, the stiffness of the actuator system (e.g., the respective actuator assembly 204, 205 and shaft 202) with which each bearing assembly 206, 207 is coupled. A relatively higher preload 208, 209 produces a relatively stiffer actuator assembly, while a relatively lower preload 208, 209 produces a relatively less stiff actuator assembly. Hence, effectively and collectively "tuning" the preload 208, 209 associated with each respective bearing assembly 206, 207 is akin to tuning the relative stiffness of each actuator assembly 204, 205 of actuator system 200, which locally and particularly affects the vibration modes of each actuator assembly 204, 205. Generally, a relatively higher bearing preload/stiffness may result in a relatively higher frequency butterfly mode of vibration, while a relatively lower bearing preload/stiffness may result in a relatively lower frequency butterfly mode of vibration.

Thus, one can appreciate that judicious selection of an appropriate preload 208, 209 for each bearing assembly 206, 207 can serve to move apart the respective structural resonance modes of the actuator assemblies 204, 205, such as the butterfly mode frequencies. In view of the aforementioned deleterious effects, e.g., on the operating performance of a corresponding hard disk drive, that the coupling of actuator system modes between the actuator assemblies may have when the modes overlap or are in close proximity to each other, one can further appreciate that moving apart the respective structural resonance modes may be effective in inhibiting the transmission of vibrational forces from one operating actuator assembly to the other actuator assembly in a dual-actuator shared shaft actuator system such as actuator system 200. Experimentation has shown that a non-trivial reduction in the coupling transfer function gains of actuator assembly/system vibration modes may be achieved by separating their resonant frequencies, which in turn can serve to combat high track mis-registration (TMR) within a corresponding hard disk drive.

Furthermore, the techniques described herein may be implemented using equivalent or substantially identical bearing assemblies 206, 207, but for their respective preloads 208, 209, and/or substantially identical bearing mechanisms within each bearing assembly 206, 207, according to embodiments. Still further, the techniques described herein may be implemented using the same actuator assemblies 204, 205 (i.e., similarly designed, configured, constructed parts, such as sub-components having the same part number in manufacturing), which typically provides a cost benefit to large-scale manufacturing.

Figure 3:
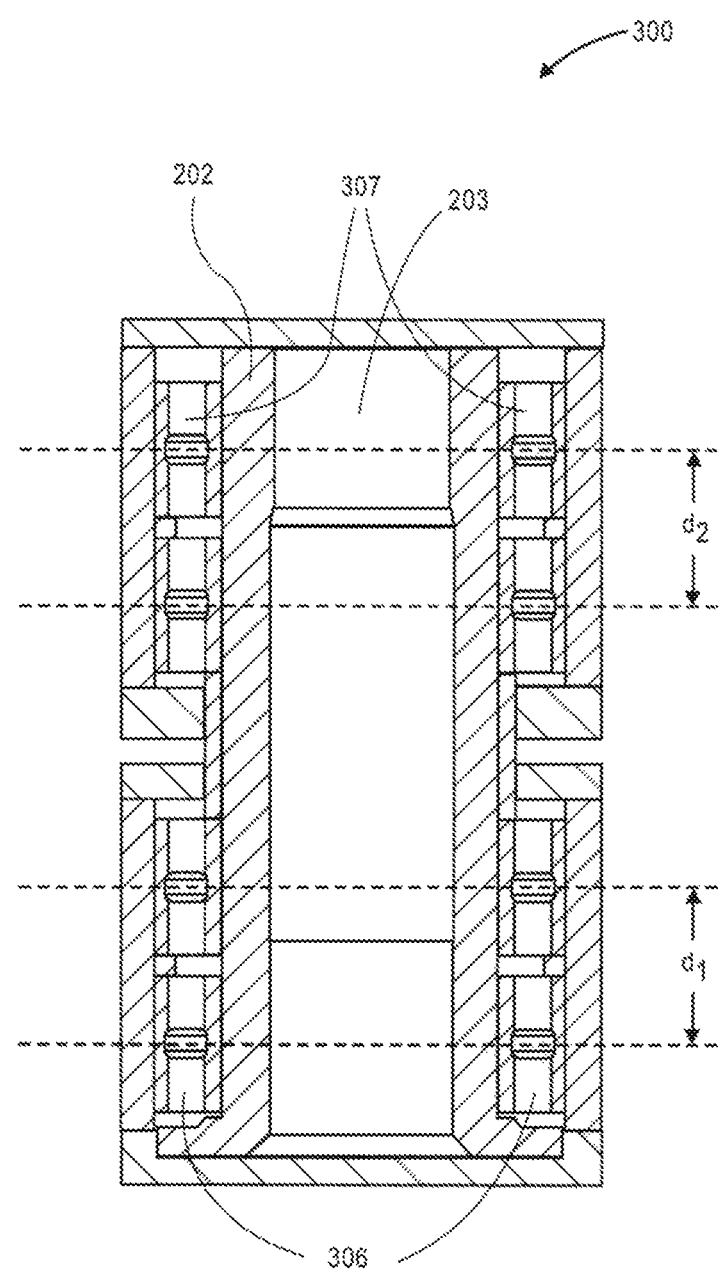
FIG. 3 is a cross-sectional side view illustrating an actuator pivot assembly, according to an embodiment.

While the foregoing differential bearing preloading is at least in part directed to moving apart the respective structural resonance modes of the actuator assemblies 204, 205, such as the butterfly mode frequencies, the rocking or tilt modes of the actuator assemblies 204, 205 may also be a concern. FIG. 3 is a cross-sectional side view illustrating an actuator pivot assembly, according to an embodiment. Pivot assembly 300 may be configured with similar features as described herein in reference to actuator assembly 200 (FIG. 2). Hence, reference is made to the illustrations and descriptions corresponding to actuator assembly 200 for an understanding of like features of pivot assembly 300, i.e., features for which descriptions are not necessarily repeated here in reference to FIG. 3. However, rather than employing bearing assemblies 206, 207, pivot assembly 300 comprises a lower bearing assembly 306 having a bearing span or spacing $d_1$ and an upper bearing assembly 307 having a bearing span or spacing $d_2$, where $d_1$ and $d_2$ represent the distance between the bearings in each respective bearing assembly 306, 307.

The rocking/tilt and butterfly modes of the actuator assemblies 204, 205 are effectively the same if the actuators and pivot bearings, including each bearing span, are identical and the boundary conditions (attach points of the pivot to the base and cover) are substantially the same. Hence, if the modes are at the same frequencies for the lower and upper actuator assemblies 204, 205, then they couple strongly. According to an embodiment, bearing spacing $d_1$ of bearing assembly 306 is different from bearing spacing $d_2$ of bearing assembly 307. Similar to implementing different bearing preloads to advantageously affect the respective butterfly modes, one can appreciate that judicious selection of an appropriate bearing spacing $d_1$, $d_2$ for each bearing assembly 306, 307 can serve to move apart the respective structural resonance modes of the actuator assemblies 204, 205, such as the rocking/tilt mode frequencies.

Method for Manufacturing an Actuator Pivot Assembly

Figure 4:
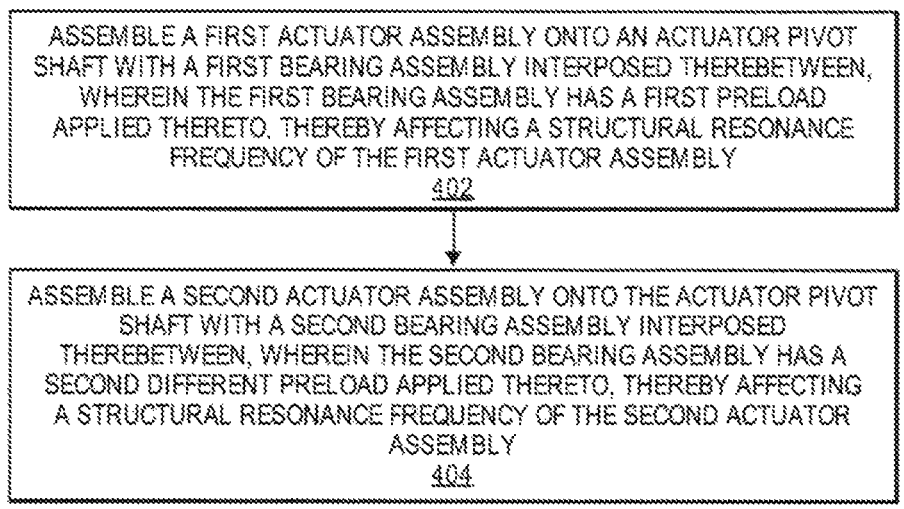
FIG. 4 is a flow diagram illustrating a method for manufacturing an actuator pivot assembly, according to an embodiment.

FIG. 4 is a flow diagram illustrating a method for manufacturing an actuator pivot assembly, according to an embodiment. For example, the method of FIG. 4 could be employed to manufacture an actuator system for a dual-actuator shared shaft hard disk drive (HDD), such as actuator system 200 illustrated and described in reference to FIG. 2.

At block 402, a first actuator assembly is assembled onto an actuator pivot shaft, with a first bearing assembly interposed therebetween, where the first bearing assembly has a first preload applied thereto, which affects the structural resonance frequency of the first actuator assembly. For example, actuator assembly 204 (e.g., a voice coil actuator, and including an E-block carriage 204a, such as carriage 134 of FIG. 1) is rotatably coupled with an actuator pivot bearing assembly (e.g., pre-assembled) comprising the shaft 202 and the bearing assembly 206 that has been preloaded with a corresponding particular preload 208.

At block 404, a second actuator assembly is assembled onto the actuator pivot shaft, with a second bearing assembly interposed therebetween, where the second bearing assembly has a second different preload applied thereto, which affects the structural resonance frequency of the second actuator assembly. For example, actuator assembly 205 (e.g., a voice coil actuator, and including an E-block carriage 205a, such as carriage 134 of FIG. 1) is rotatably coupled with the actuator pivot bearing assembly comprising the shaft 202 and the bearing assembly 207 that has been preloaded with a corresponding particular preload 209 that is different from the particular preload 208. Actuator assembly 205 may be the same substitutable sub-component as actuator assembly 204. Bearing assembly 207 may be constructed with the same substantially identical bearing mechanisms as in the same sub-component of bearing assembly 206.

As described herein, judicious selection of an appropriate preload 208, 209 for each bearing assembly 206, 207 can serve to move apart the respective structural resonance modes of the actuator assemblies 204, 205 (such as the butterfly mode frequencies) such that the transmission of vibrational forces from one actuator assembly 204, 205 to the other actuator assembly, and any associated deleterious effects due to mode coupling, in a dual-actuator shared shaft actuator system such as actuator system 200 is inhibited.

Extensions and Alternatives

While embodiments, techniques and approaches are described herein throughout in the context of a dual-actuator system, it is contemplated and one can appreciate that these embodiments, techniques and approaches may be similarly applied to and implemented in multi-actuator systems, generally. That is, the number of actuators or actuator assemblies in a multi-actuator system in which the described embodiments, techniques and approaches may be implemented is not limited to two.

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A data storage device comprising:
a plurality of recording disk media rotatably mounted on a spindle;
a first head slider comprising a read-write transducer configured to read from and to write to one disk media of said plurality of disk media;
a first rotary actuator assembly configured to move said first head slider to access portions of said one disk media;
a second head slider comprising a read-write transducer configured to read from and to write to another disk media of said plurality of disk media;
a second rotary actuator assembly configured to move said second head slider to access portions of said another disk media; and
a shaft around which said first rotary actuator assembly is rotatably coupled, with a first bearing assembly interposed therebetween with a first particular bearing preload, at a first location of said shaft and said second rotary actuator assembly is rotatably coupled, with a second bearing assembly interposed therebetween with a second particular bearing preload, at a second location of said shaft;
wherein said first particular bearing preload is intentionally different from said second particular bearing preload.

2. The data storage device of claim 1, wherein said first bearing assembly and said second bearing assembly are similarly constructed parts, and wherein a stiffness of said first bearing assembly is based on said first particular bearing preload and a stiffness of said second bearing assembly is based on said second particular bearing preload, and thereby said stiffness of said first bearing assembly is different from said stiffness of said second bearing assembly.

3. The data storage device of claim 2, wherein each of said first and second bearing assemblies comprises a pair of equivalent bearings.

4. The data storage device of claim 3, wherein said first bearing assembly comprises a first bearing spacing and said second bearing assembly comprises a second bearing spacing that is different from the first bearing spacing.

5. The data storage device of claim 1, wherein said first rotary actuator assembly and said second rotary actuator assembly comprise similarly constructed parts.

6. The data storage device of claim 1, wherein said first particular bearing preload corresponds to a first structural resonance mode of said first rotary actuator assembly and said second particular bearing preload corresponds to a second structural resonance mode of said second rotary actuator assembly, and wherein said first particular bearing preload and said second particular bearing preload are such that a first frequency corresponding to said first structural resonance mode is separated from a second frequency corresponding to said second structural resonance mode.

7. The data storage device of claim 6, wherein said first particular bearing preload and said second particular bearing preload are such that a gain corresponding to a coupling transfer function between said first and second rotary actuator assemblies is less than would otherwise be in an actuator system in which said first and second bearing preloads are equivalent.

8. The data storage device of claim 6, wherein each of said first structural resonance mode and said second structural resonance mode is a butterfly mode.

9. A hard disk drive actuator pivot assembly comprising:
a lower bearing assembly having a first particular preload;
an upper bearing assembly having a second particular preload different from said first particular preload;
wherein each of said lower and upper bearing assemblies comprises a pair of substantially identical bearing mechanisms;
wherein said lower bearing assembly comprises a lower bearing span and said upper bearing assembly comprises an upper bearing span that is different from the lower bearing span;
a lower voice coil actuator assembly, wherein said lower bearing assembly is interposed between a shared pivot shaft and said lower voice coil actuator assembly; and
an upper voice coil actuator assembly, wherein said upper bearing assembly is interposed between said shared pivot shaft and said upper voice coil actuator assembly;
wherein said lower voice coil actuator assembly and said upper voice coil actuator assembly comprise similarly configured components.

10. The hard disk drive actuator pivot assembly of claim 9, wherein a stiffness of said lower bearing assembly is based on said first particular preload and a stiffness of said upper bearing assembly is based on said second particular preload, and thereby said stiffness of said lower bearing assembly is different from said stiffness of said upper bearing assembly.

11. The hard disk drive actuator pivot assembly of claim 9, wherein said first particular preload corresponds to a structural resonance mode of said lower voice coil actuator assembly and said second particular preload corresponds to a structural resonance mode of said upper voice coil actuator assembly, and wherein said first particular preload and said second particular preload are such that a frequency at which said structural resonance mode of said lower voice coil actuator assembly occurs is intentionally different from a frequency at which said structural resonance mode of said upper voice coil actuator assembly occurs.

12. The hard disk drive actuator pivot assembly of claim 9, wherein said lower and upper voice coil actuator assemblies, said lower and upper bearing assemblies, and said shared pivot shaft compose an actuator system, and wherein said first particular preload and said second particular preload are such that a gain corresponding to a coupling transfer function in said actuator system is less than would otherwise be in an actuator system in which said first and second preloads are equivalent.

13. A hard disk drive comprising the actuator pivot assembly of claim 9.

14. A hard disk drive dual-actuator shared shaft assembly comprising:
a lower actuator assembly coupled with said shared shaft; and
an upper actuator assembly coupled with said shared shaft; and
means for separating a structural resonance mode frequency corresponding to said lower actuator assembly from a structural resonance mode frequency corresponding to said upper actuator assembly.

15. The hard disk drive dual-actuator shared shaft assembly of claim 14, wherein each of said structural resonance mode frequency corresponding to said lower actuator assembly and said structural resonance mode frequency corresponding to said upper actuator assembly is a butterfly mode of vibration.

16. The hard disk drive dual-actuator shared shaft assembly of claim 14, wherein each of said structural resonance mode frequency corresponding to said lower actuator assembly and said structural resonance mode frequency corresponding to said upper actuator assembly is a rocking mode of vibration.

17. A method for manufacturing an actuator pivot assembly, the method comprising:
   assembling a first actuator assembly onto an actuator pivot shaft with a first bearing assembly interposed therebetween, wherein said first bearing assembly has a particular first preload applied thereto, thereby affecting a structural resonance frequency of said first actuator assembly; and
   assembling a second actuator assembly onto said actuator pivot shaft with a second bearing assembly interposed therebetween, wherein said second bearing assembly has a second internationally different particular preload applied thereto, thereby affecting a structural resonance frequency of said second actuator assembly.

18. The method of claim 17, wherein said first and second particular preloads are selected to move apart said structural resonance frequency of said first actuator assembly and said structural resonance frequency of said second actuator assembly.

19. The method of claim 17, wherein said first and second particular preloads are selected to move apart a butterfly mode of vibration frequency of said first actuator assembly and a butterfly mode of vibration frequency of said second actuator assembly.

20. The method of claim 17, wherein said first and second bearing assemblies are equivalent bearing assemblies.

* * * * *